United States Patent [19]

Quigley, Jr. et al.

[11] 3,834,161

[45] Sept. 10, 1974

[54] DUAL MODE AUXILIARY POWER UNIT

[75] Inventors: Richard E. Quigley, Jr., Kettering; Buryl L. McFadden, Jr., Dayton, both of Ohio

[73] Assignee: The United States of America as represented by the Air Force, Washington, D.C.

[22] Filed: June 1, 1973

[21] Appl. No.: 365,908

[52] U.S. Cl. ............. 60/244, 60/270, 60/39.14, 60/39.15, 60/39.16, 60/39.33
[51] Int. Cl. ............................................ F02k 3/12
[58] Field of Search ............ 60/39.16 R, 244, 39.33, 60/245, 270, 247, 39.15, 39.14

[56] References Cited
UNITED STATES PATENTS

| | | |
|---|---|---|
| 2,934,895 | 5/1960 | Gregory et al. .................. 60/244 |
| 2,955,414 | 10/1960 | Hausmann ............................ 60/244 |
| 3,087,691 | 4/1963 | Rainbow ....................... 60/39.16 R |
| 3,442,082 | 5/1969 | Peterson ............................. 60/262 |
| 3,635,029 | 1/1972 | Menioux ............................. 60/224 |

Primary Examiner—C. J. Husar
Assistant Examiner—O. T. Sessimo
Attorney, Agent, or Firm—Harry A. Herbert, Jr.; Arthur R. Parker

[57] ABSTRACT

An aircraft on-board auxiliary power unit including a gas turbine-core and ram combustor uninterruptedly producing relatively low and high velocity hot gases to drive a free, power turbine positioned downstream thereof and interconnected with, and driving an auxiliary equipment-operating shaft to thereby provide a turboramjet aircraft with all flight vehicle power requirements throughout its entire operating regime, including ground standby.

10 Claims, 3 Drawing Figures

DUAL MODE AUXILIARY POWER UNIT

BACKGROUND OF THE INVENTION

The present invention relates generally to a totally self-sufficient, aircraft on-board auxiliary power unit for use with a turboramjet aircraft.

The turboramjet aircraft has long been under study for use as an advanced high performance aircraft. One problem involved with ramjet engines is that they do not incorporate any main rotating members and are therefore unable to provide the shaft power required to drive the aircraft flight vehicle power system. Therefore, it is obvious that some type of auxiliary power unit is required, which unit would constitute the "prime" and only source of shaft power during ramjet powered flight.

Although both ramjet and turboramjet engines have been under development for more than 20 years, almost no effort or attention has been given to the auxiliary power system, which will be required for aircarft powered with such engines, even though auxiliary power systems have long been used with other aircraft. In this connection, historically, the auxiliary power "unit", which has come to mean the power producer of the total system, referred to a separate piece of equipment with its own gearbox, generators, hydraulic pumps and so forth. It was generally packaged somewhere in the aircraft fuselage entirely separated from the main engine(s). Because of the evolutionary squeeze on the volume of on-board aircraft equipment, the auxiliary power unit (APU) has been integrated with the main gearbox and accessories, resulting in a significant reduction in frontal area, volume, and weight while still retaining self-sufficient operation. In connection with the latter, totally self-sufficient operation has been defined as meaning that the aircraft has an on-board source of auxiliary power which can be used to start the main engine(s), operate the aircraft subsystems without the need for mobile ground equipment or the need for the main engines to be in operation, and to provide power for other necessary aircraft functions independent of ground servicing equipment.

In the past (1955–1960), the auxiliary power requirements were typically less than 100 HP per propulsion engine, and engine starting requirements were also less than 100 HP. Moreover, the altitudes and velocities encountered in flight were such that compartment temperatures for the auxiliary power system and flight control mechanisms seldom exceeded 200°F unless internally heated from aircraft accessories or nearby exhaust ducting. The only aircraft which were totally self-sufficient were cargo or passanger types on which the volume and weight penalties associated with an on-board auxiliary power unit (APU) were not severe.

Today's power requirements are far beyond the 1955–1960 level. For example, the power requirement to start current turbofan engines is typically about 150 HP, mainly to prevent compressor surge. The modern highly loaded compressors must be accelerated to higher speeds before light-off is initiated. In addition, today's aircraft utilize massive quantities of power consuming avionics which are not tolerant to wide temperature variations so that increased environmental control cooling, and, in turn, auxiliary power output is required. Moreover, today's aircraft are almost always desirably self-sufficient, so that their dependence on groung equipment is greatly reduced. The requirement for inflight emergency power has grown from the typical 5KVA ram air turbine to a stored propellant APU with 100 HP for 30 minutes duration to assist a windmilling turbojet to start or to provide all-engine-out flight control capability. Compartment temperatures have risen to the limit of auxiliary power system components.

Since, from extrapolation of the above-outlined historical trends in the ever-increasing auxiliary power requirements of modern-day aircraft, it is obvious that such requirements for future aircraft will dwarf existing auxiliary power sources. In this regard, power requirements must go up if for no other reason than the increased cooling load resulting from high Mach number aerodynamic heating. Accordingly, the new and improved dual mode auxiliary power unit of the present invention, which involves the combination of a turbojet and ramjet arrangement, offers the solution to the greatly increased auxiliary power requirements of future high performance aircraft by the utilization of the unique and simplified means to be further set forth hereinafter in the following summary and detailed description thereof.

SUMMARY OF THE INVENTION

The present invention consists briefly in a single, unitary and improved aircraft on-board gas turbine auxiliary power unit that uniquely combines a conventional gas turbine-core that includes compressor, combustor and core-turbine elements, and a bypass annulus or ramjet duct in which is disposed a ram combustor, with a free, power turbine that may be geared to an auxiliary equipment-operating shaft. This unit operates in two modes; namely, a conventional mode, while the aircraft in which it is mounted is either on ground standby or engaged in relatively low speed flight, and in a ram mode for relatively high speed flights. In the first, conventional mode, the gas turbine-rotatable compressor element compresses relatively low pressure air and directs the compressed air into the core-combustor where it is mixed with fuel and the fuel-air mixture then ignited to produce relatively low velocity-hot gases that are expanded through the core-turbine and then through the free, power turbine, where the latter and its interconnected auxiliary equipment-operating shaft are thereby driven.

In the second, ram mode, the inventive auxiliary power unit operates at supersonic flight speeds, during which the rotating compressor is bypassed and relatively high pressure air is admitted into the bypass annulus or ramjet duct by way of the unit's main air intake which is ducted to the main air inlet of a turboramjet engine with which it is specifically integrated. Of course, at this time, the high performance aircraft with which the invention has been specifically applied is moving at supersonic speeds. This relatively high pressure air is directed through the ramjet duct into the ram combustor where it is mixed with fuel and burned to produce relatively high pressure-combustion products that are thereafter expanded across, and thus provide the sole power to drive the novel free, power turbine and the auxiliary equipment-operating shaft in driving engagement therewith.

Other objects and advantages of the invention will appear self-evident hereinafter from the following disclosure, taken in connection with the accompanying drawings; in which:

DESCRIPTION OF THE PREFERRED EMBODIMENT

Figure 1:
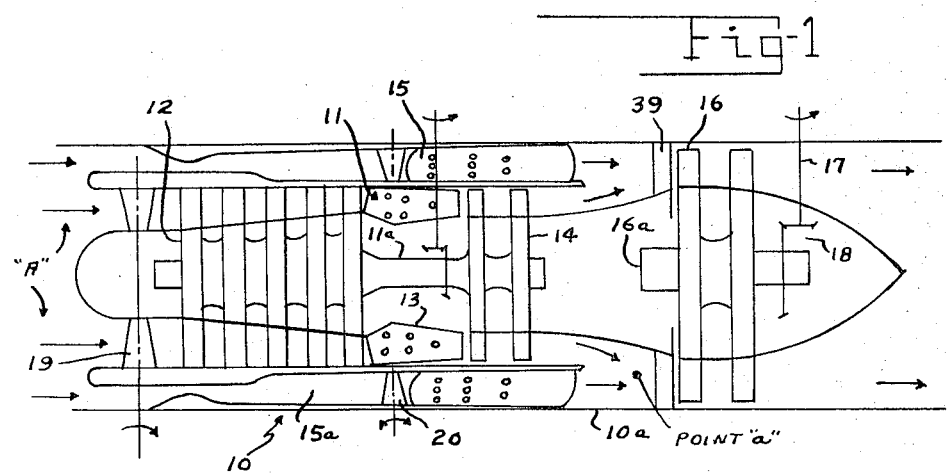
FIG. 1 is a schematic, side elevation, and partly broken-away view, illustrating details of the novel dual mode auxiliary power unit of the present invention.

Referring generally to the drawings and, in particular, to FIG. 1 thereof, the new and improved aircraft on-board gas turbine, dual mode auxiliary power unit (APU) of the present invention is indicated generally at 10 as principally comprising a main outer casing 10a with which is mounted a conventional gas turbine-core 11 having the usual compressor, combustor and turbine elements, indicated respectively at 12, 13 and 14, and a ram combustor 15. The compressor 12 and turbine 14 are mounted for rotation together, in a standard manner, on a common rotating shaft 11a, and the ram combustor 15 is appropriately positioned in an annular by-pass or ramjet duct, indicating generally at 15a as surrounding the outer circumference of, and disposed between the gas turbine-core 11 and the outer casing 10a, as is clearly shown. To alternately control the incoming air, by way of the main air intake at the arrows marked A, through either the core 11 or the bypass or ramjet duct 15a, a pair of valves, as indicated respectively at 19 and 20, are provided for this purpose. These valves 19 and 20 have not been further detailed, nor the specific control means therefor illustrated, for the reason that such is unimportant to the present invention. Suffice to say that they may be comprised of and be similar in all respects to the variable geometry inlet guide vanes used on a wide variety of current gas turbine engines, one example of which being that disclosed in U.S. Pat. No. 3,280,564, issued to J. G. Keenan et al on Oct. 25, 1966.

In accordance with the specific teaching of the present invention, in unique combination with both of the said gas turbine-core 11 and ram combustor 15, and disposed further downstream from the outlets thereof for independent rotation on its own separate stub shaft 16a, is the novel free, power turbine 16 of the inventive arrangement. In driving engagement with said free, power turbine 16, by means of appropriate portions of an engaging gear mechanism, shown schematically and generally at 18, is the main, auxiliary equipment-operating power shaft at 17. The new and improved technique for providing continual power to the said power shaft 17 by the novel means of the present invention will be further described hereinbelow.

Figure 2:
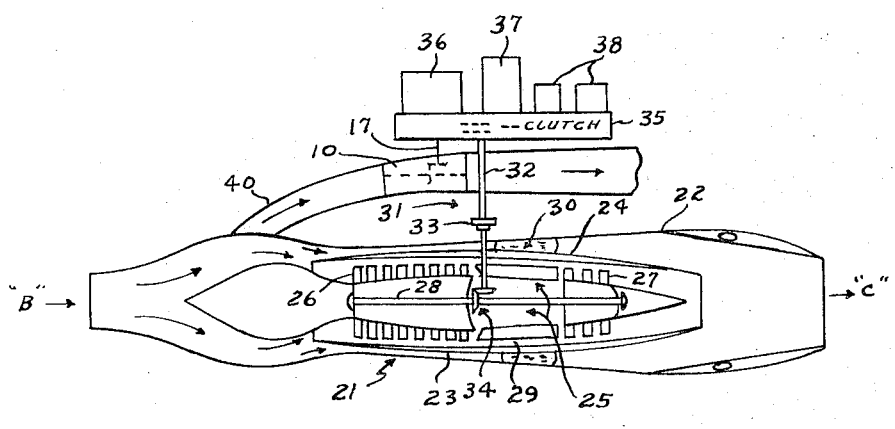
FIG. 2 illustrates an overall schematic view, in side elevation, and partly broken-away, showing the dual mode auxiliary power unit of the invention generally integrated with the turboramjet engine of a high performance aircraft.

With particular reference to FIG. 2, the inventive dual mode auxiliary power unit (APU), again indicated generally at 10, is shown combined with a turboramjet engine 21 that consists mainly in an outer body portion 22 having a main, air inlet at its upstream end, as indicated generally at the arrow B, and an exhaust at its downstream end, as depicted by the arrow C. Positioned in intermediate relation within the said outer body portion 22, and spaced therefrom by the annular bypass or ramjet duct 23 is an inner body portion 24 that incorporates the gas turbine engine-portion 25 of the present turboramjet engine 21.

The above-noted gas turbine engine-portion 25 of FIG. 2 includes a conventional compressor at 26 and turbine at 27 mounted on a common rotating shaft 28. The gas turbine and ram combustors would be located generally at 29 and 30. To start the turboramjet 21, a mechanical link means, indicated generally at 31 is required between it and the inventive dual mode auxiliary power unit 10. Said mechanical link means actually comprises a relatively elongated shaft member 32 which may incorporate a conventional decoupler at 33 at an intermediate location therealong and be further operably and indirectly interconnected with the main, power shaft 17 of said auxiliary power unit 10 by any suitable clutch mechanism located within the accessary drive gearbox at 35. Neither the decoupler or clutch mechanisms are shown in detail, since the specific nature of each is unimportant to the present invention. The power transfer between the elongated shaft 32 and the rotating compressor 26 is made through the inter-engaging gear means indicated schematically and generally at the reference numeral 34. Some of the auxiliary or accessory equipment to be operated by the inventive auxiliary power unit 10, and its power shaft 17, through the said gearbox 35, may be, for example, the generator, coolant compressor and hydraulic pumps, indicated respectively and schematically at 36, 37 and 38 (FIG. 2). Thus, the said mechanical link means 31 inherently provides redundancy or back-up support for the inventive auxiliary power unit and system in the case of an emergency. Due to the cycle pressure ratio and turbine inlet temperature differences inherently existing between the APU 10 and the main turboramjet engine 21, the velocity and altitude at which the APU switches from conventional to ram mode will not necessarily occur at the same time the main engine, as at 21, is transitioning from turbojet to ramjet propulsion. Naturally, this provides a further advantage to the dual mode APU approach of the present invention in that by transitioning from its conventional mode to the ram mode while the main engine(s), as at 21, is still in the turbojet mode the pilot or other air crew can be assured of a very reliable and uninterrupted source of flight vehicle power during transition to ramjet propulsion.

Again referring to FIG. 1, the dual mode auxiliary power unit 10 could utilize a variable geometry turbine inlet nozzle at 39 for the previously-described free, power turbine 16 to specifically provide for smooth transition to and from the ram mode, and to control the speed of the free, power turbine 16 during the ram mode. With this unique arrangement, therefore, when the inventive auxiliary power unit 10 is to operate in its first, conventional mode, valve 19 (Note FIG. 1) is opened and valve 20 closed. Thereafter, operation of the gas turbine-core 11 produces hot gas from the mixture of air admitted through the inlet or intake A, compressed in the rotating compressor 12 and mixed with fuel and ignited in the core-combustor 13. The relatively low speed hot gas produced thereby is then expanded through the core APU turbine 14, and, finally, through the novel power turbine 16 to provide power for the latter to drive it and its interconnected auxiliary equipment-operating shaft 17.

When the present auxiliary power unit (APU) is to operate in its second, ram mode, valve 19 is closed and valve 20 is opened. High pressure air is available to the unit from the inlet duct 40 (See FIG. 2) that is ducted to the main engine air intake, when the turboramjet aircraft in which it is installed is moving at supersonic speeds. Valve 20 modulates this flow of high pressure air, that has entered the bypass or ramjet duct 15a, into the ram combustor 15 where it is mixed with fuel and burned. The combustion products thereof are then expanded across the free, power turbine 16 to drive it and the auxiliary equipment-operating power shaft 17. It is noted that during this second ram mode, the inventive APU provides the prime and sole source of power to the said shaft 17.

With the modulated control of the flow inherently provided by the variable geometry valves 19 and 20, a smooth transition between conventional and ram modes, and vice versa is assured. Thus, for example, to transition from the conventional to the ram mode would be accomplished when the ram combustor 15 could supply a higher pressure at the point a than could be supplied by the APU core 11. Then, to accomplish the requisite transition, valve 20 would be opened slightly and then combustion established in the ram combustion 20. Next, the fuel flow to the APU core 11 would be shut off, and valve 19 closed. Thereafter, valve 20 would be gradually opened and the fuel flow increased to the ram combustor 15 until the required output power is attained.

To transition back to the first, conventional mode would be accomplished by initially partially opening valve 19 and motoring the APU core 11 up to its self-sustaining speed. Then, valve 20 would be closed and the fuel flow to the ram combustor 15 shut off. Finally, valve 19 would be opened and the speed of the APU core 11 increased until the required power is achieved.

Figure 3:
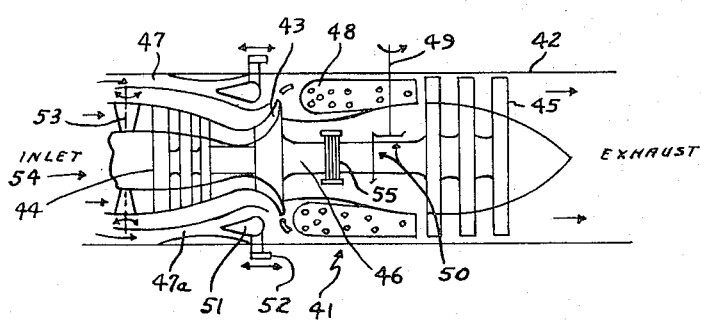
FIG. 3 is another schematic, side elevational view, partly broken-away, showing details of a modified form of the dual mode auxiliary power unit of FIG. 1, in which the same turbine and combustion means are used for both conventional and ram modes of operation of the invention.

With particular reference to FIG. 3, a modified form of the inventive auxiliary power unit is indicated generally at 41 as comprising a main casing at 42, a compressor housing section at 43 incorporating the rotatable compressor at 44, and a turbine section at 45 that, for purposes of the first, conventional mode may be interconnected with and rotatable by a common rotating shaft at 46. The walls of the compressor housing section 43 are spaced from and suitably configured to thereby form a bypass or ramjet duct 47 with the main casing 42. A single common combustor, at 48, is positioned downstream of the outlets of each of the compressor housing section 43 and bypass or ramjet duct 47 for respectively receiving in turn the compressed air produced either by the rotating compressor 44 during engine starting and relatively low speed flight, or when the aircraft in which mounted is moving at supersonic speeds. It is noted that, as clearly illustrated in the aforementioned FIG. 3, the bypass or ramjet duct 47 leads into the combustor 48, and the outlet from the compressor housing section 43 is made specifically divergent in configuration and of a suitable size so as to positively provide for the specific directing of the compressed air being created thereby to the same combustor 48. Thus, as noted hereinbefore, combustor 48 acts as a common combustor for both conventional and ram modes of operation of the modified auxiliary power unit of FIG. 3. In this manner, compressed air, respectively produced by the rotation of the compressor 44, the conventional mode, and by the high speed or supersonic flight of the turboramjet, as at 21 (FIG. 2) in which installed, is directed to the combustor 48 where it is mixed with fuel and burned. The hot gases therefrom are respectively expanded against the turbine 45 where it is rotated to thereby actuate a main, auxiliary equipment-operating shaft, shown schematically at 49 and which may be in operative, driving engagement with the rotating shaft 46 by interengaging gears at 50. As in the case of the FIG. 1 modification, during the conventional mode, again, as in the case of the inventive form of FIG. 1, the modified auxiliary power unit (APU) of FIG. 3 acts as a conventional gas turbine for providing for the starting of the main engine(s) and for relatively low speed aircraft flight. At this time, the rotation of the shaft at 46 occuring during the conventional mode automatically actuates the axuiliary equipment-operating shaft at 49.

To effect the above-referred to conventional mode of operation, a first, variable geometry valve at 51, adjustably disposed in the by-pass or ramjet duct 47 and slidably operable in back-and-forth movement by the operating means seen in schematic form at 52 to gradually open and/or close the said duct 47 at its narrowest point indicated in the general area at 47a, may be closed, and a second, variable valve 53 within the inlet of the compressor housing section 43 opened. In this manner, operation of the compressor 44 compresses incoming air from the air inlet at 54, which compressed air is directed into the common combustor 48 where it is mixed with fuel and burned to form relatively low pressure hot gases that expand against and drive the turbine 45 and its interconnected auxiliary equipment-operating shaft 49 for providing the auxiliary power required for starting the main engine(s) and during relatively low speed flight. Of course, to provide for the ram mode of operation, the position of the aforementioned valves 51 and 53 are reversed, with valve 51 being opened and valve 53 being closed. The high speed or supersonic flight of the aircraft will naturally automatically provide high pressure air at the inlet to the duct 47 where it will be directed into, and mixed with fuel and burned in the same common combustor 48 used during the conventional mode. The hot gases produced thereby are, as in the case of the said conventional mode, expanded against the turbine 45 to drive it and its interconnected power shaft 49. At this time, however, the turbine 45 will have become a free, power turbine, as in the case of the power turbine 16 of FIG. 1, for the reason that the rotating shaft 46 will have now been disconnected from the compressor 44 by the appropriate use of a conventional decoupler means, indicated schematically and generally at 55. The latter, which may also incorporate a clutch device to restart the compressor during transition from the ram to the conventional mode, is not specifically illustrated, since any of a number of well-known and already available conventional decouplers or disconnect mechanisms, such as a splined shaft, may be used without departing from the true spirit or scope of the invention.

Thus, a new and improved aircraft on-board auxiliary power unit has been developed that ensures the totally self-sufficient operation of a turboramjet by combining in a single unit integrated with the main aircraft engine(s) a conventional gas turbine-core operating in a conventional mode to produce hot gases from a rotating compressor to drive a free, power turbine and interconnected shaft during ground standby and relatively low speed flight, and a ram combustor operating in a ram mode to produce hot gases from high pressure air forced into the ramjet duct during relatively high speed flight.

We claim:

1. A compound jet power plant comprising; a turbojet engine for providing subsonic and relatively low supersonic speeds, and including compressor and turbine sections mounted on a common, rotatable shaft positioned in an inner body housing said compressor and turbine sections, and incorporating an air inlet, a combustor and an exhaust outlet; a ramjet engine for providing relatively high supersonic and hypersonic speeds, and including an outer body constituting the main enclosure for said turbojet and ramjet engines, and surrounding and being spaced further outwardly of said turbojet engine-inner body to form an annular bypass or ramjet duct therewith having an air inlet, a ramjet combustor incorporated in said ramjet duct and an exhaust outlet; a common air intake/diffuser oriented as a forwardly or upstream-extending projection of said ramjet engine-outer body, and a common exhaust outlet therefor; an aircraft accessory drive gearbox; and an aircraft on-board gas turbine auxiliary power unit having a main air intake duct communicating with the common air intake-diffuser of said turboramjet engine; a common exhaust outlet; a main, outer casing incorporating and being integral with the main air intake duct and exhaust outlet; a main, auxiliary equipment-operating shaft in driving engagement, at one end thereof, with the aircraft accessory drive gearbox; power-applying means rotatably mounted within the main, outer casing along the longitudinal axis thereof and interconnected in driving engagement with said main, auxiliary equipment-operating shaft; gas turbine-core means including a rotatable compressor for initially receiving and pressurizing relatively low pressure air being automatically introduced into the main air intake duct through said communicating turboramjet engine-air intake-diffuser during the operation of said gas turbine-core means constituting the conventional mode of operation of said auxiliary power unit; a bypass-annulus or ramjet duct surrounding, and interposed between said gas turbine-core means and said main, outer casing for subsequently receiving relatively high pressure air being automatically introduced into an inlet thereof through said air intake/diffuser and said main air intake duct during the ramjet mode of operation of said auxiliary power unit; combustion means for receiving, mixing and igniting with fuel the relatively low and high pressure air being respectively introduced thereinto from, and during a sequential operation of the rotating compressor and the bypass annulus or ramjet duct respectively resulting from said conventional and ramjet modes of auxiliary power unit operation; and valve meas respectively positioned at the inlets of said gas turbine-core means and bypass annulus or ramjet duct, and operable between oppositely-rotated positions to thereby respectively open and close said inlets during the said sequential operation of said gas turbine-core means and ramjet duct, and thus ensure that the said rotatable, power-applying means alternately receives and is driven in rotation, together with the said auxiliary equipment-operating shaft in driving engagement therewith, by relatively low and high pressure gases being respectively produced by and expanded from said combustion means during the corresponding operation of said rotating compressor and bypass annulus or ramjet duct.

2. In an aircraft on-board gas turbine auxiliary power unit as in claim 1, wherein said gas turbine-core means further includes a first, rotatable shaft mounting said gas turbine-core means-compressor thereon; and said rotatable power-applying means comprises a turbine positioned in driving engagement with a normally interconnected, selective-shaft-attachment means with said gas turbine compressor-mounting, first, rotatable shaft said turbine at a location downstream of said combustion means.

3. In an aircraft on-board gas turbine auxiliary power unit as in claim 2, wherein said gas turbine-compressor-mounting, first, rotatable shaft interconnects, through said selective-shaft-attachment means, in driving relation with a second, auxiliary equipment-operating shaft, mounting said turbine for rotation therewith and disposed along the longitudinal axis of said auxiliary power unit in alignment with said first, rotatable shaft, at a position thereon upstream of said turbine and downstream from said selective-shaft-attachment means; and said selective-shaft-attachment means being disconnectable to release said second, auxiliary equipment-operating shaft and the turbine mounted thereon from its normally interconnected relation with said compressor and thus allowing the hot gases being produced from the combustion resulting from an igniting of the mixture of fuel and relatively high pressure air from the bypass annulus or ramjet duct in the said combustion means to expand against and thus independently rotate the now-freed turbine and the main, auxiliary equipment-operating shaft interconnected therewith during the high speed flight of the aircraft and ramjet operation of the engine.

4. In an aircraft on-board gas turbine auxiliary power unit as in claim 1, wherein said combustion means comprises a first, gas turbine-core combustor, and a second, ram combustor disposed in the bypass annulus or ramjet duct.

5. In an aircraft on-board gas turbine auxiliary power unit as in claim 1, wherein said gas turbine-core means further includes a common, rotatable and relatively elongated shaft mounting said compressor at, or nearly adjacent the upstream end thereof; a first, gas turbine-combustor for receiving and compressing relatively low pressure air received from said compressor, and a separate core-turbine mounted on the downstream end of said common shaft; said combustion means comprising said first, gas turbine-combustor, and a second, ram combustor positioned in the bypass annulus or ramjet duct.

6. In an aircraft on-board gas turbine auxiliary power unit as in claim 5, and mechanical link means indirectly interconnected in driving relation between said main, auxiliary equipment-operating shaft and said common, rotatable shaft of said turboramjet and being automatically operable to provide a self-starting feature for said turboramjet engine during the conventional mode of operation of the said auxiliary power unit.

7. In an aircraft on-board gas turbine auxiliary power unit as in claim 6, wherein said mechanical link means comprises a relatively elongated and rotatable shaft engageable at one end thereof to a clutch mechanism disposed within the said accessory drive gearbox, and being further interconnected at its other end to the said common rotating shaft of said gas turbine through interengaging means and incorporating a decoupler at an intermediate position therealong for automatically decoupling the portion of said mechanical link-shaft being indirectly driven from the operation of said main, auxiliary equipment-operating shaft.

8. In an aircraft on-board gas turbine auxiliary power unit as in claim 5, wherein said rotatable, power-applying means comprises a free turbine.

9. In an aircraft on-board gas turbine auxiliary power unit as in claim 8, and a separate, relatively short or stub shaft mounting said free, power turbine and independently rotatable from the common shaft supporting the core-compressor and turbine.

10. In an aircraft on-board gas turbine auxiliary power unit as in claim 9, and gear means respectively mounted in interengaged and thus driving relation on, and between said separate stub shaft and said main, auxiliary equipment-operating shaft.

* * * * *